US012605807B2

(12) United States Patent
Uekusa et al.

(10) Patent No.: US 12,605,807 B2
(45) Date of Patent: Apr. 21, 2026

(54) ELECTRIC TOOL SYSTEM, ELECTRIC TOOL DEVICE, AND CAMERA DEVICE

(71) Applicant: Panasonic Intellectual Property Management Co., Ltd., Osaka (JP)

(72) Inventors: Koji Uekusa, Chiba (JP); Mutsuhiro Yamanaka, Osaka (JP); Ryosuke Sasaki, Osaka (JP); Kouji Ikeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 303 days.

(21) Appl. No.: 18/262,853

(22) PCT Filed: Dec. 27, 2021

(86) PCT No.: PCT/JP2021/048630
§ 371 (c)(1),
(2) Date: Jul. 25, 2023

(87) PCT Pub. No.: WO2022/163288
PCT Pub. Date: Aug. 4, 2022

(65) Prior Publication Data
US 2024/0091917 A1 Mar. 21, 2024

(30) Foreign Application Priority Data

Jan. 28, 2021 (JP) ................................. 2021-012422

(51) Int. Cl.
B25B 21/00 (2006.01)
B25B 23/147 (2006.01)
(Continued)

(52) U.S. Cl.
CPC .............. B25B 21/00 (2013.01); B25B 29/00 (2013.01); G05B 19/182 (2013.01); B25B 23/147 (2013.01); B25B 23/16 (2013.01)

(58) Field of Classification Search
CPC ....... B25B 21/00; B25B 29/00; B25B 23/147; G05B 19/182; G03B 17/561
See application file for complete search history.

(56) References Cited

U.S. PATENT DOCUMENTS 5,236,052 A * 8/1993 Ban ........................ B25B 23/147
173/176
9,724,795 B2 8/2017 Rola et al.
(Continued)

FOREIGN PATENT DOCUMENTS

DE 102016218572 A1 * 3/2018 ............. B25B 23/00
JP 2005-181365 A 7/2005
(Continued)

OTHER PUBLICATIONS

International Search Report dated Feb. 1, 2022 issued in International Patent Application No. PCT/JP2021/048630, with English translation.

(Continued)

*Primary Examiner* — Minh Q Phan
(74) *Attorney, Agent, or Firm* — Rimon P.C.

(57) ABSTRACT

An electric tool system includes an electric tool device and a camera device. The electric tool device has a drive unit and an electric tool communication unit. The drive unit performs tightening work of tightening a tightening component to a work target. The electric tool communication unit performs communication with outside. The camera device has a fixing unit, an image capturing unit, and a camera communication unit. The fixing unit is removably attached to the electric tool device. The image capturing unit captures an image of at least the work target. The camera communication unit performs communication with the outside.

7 Claims, 13 Drawing Sheets

(51) Int. Cl.
  B25B 23/16 (2006.01)
  B25B 29/00 (2006.01)
  G05B 19/18 (2006.01)

(56) References Cited

U.S. PATENT DOCUMENTS

| | | |
|---|---|---|
| 2005/0168579 A1 | 8/2005 | Imamura |
| 2014/0259599 A1 | 9/2014 | Glaspell et al. |
| 2016/0182800 A1 | 6/2016 | Kaneko |
| 2019/0294138 A1 | 9/2019 | Dobashi et al. |
| 2022/0221834 A1 | 7/2022 | Dobashi et al. |

FOREIGN PATENT DOCUMENTS

| | | | |
|---|---|---|---|
| JP | 5632527 | B1 | 11/2014 |
| JP | 2016-119615 | A | 6/2016 |
| JP | 2017-140681 | A | 8/2017 |
| JP | 2018-108633 | A | 7/2018 |
| JP | 6395081 | B2 | 9/2018 |
| JP | 2020-131412 | A | 8/2020 |
| JP | 2020-179500 | A | 11/2020 |
| WO | 2018/123433 | A1 | 7/2018 |

OTHER PUBLICATIONS

Office Action dated Jun. 25, 2024, from corresponding Japan Patent Application No. 2021-012422, 6 pages.

Extended European Search Report dated Oct. 18, 2024 issued in the corresponding European Patent Application No. 21923291.5.

Japanese Office Action dated Jan. 9, 2024 issued in the corresponding Japanese Patent Application No. 2021-012422, with English machine translation.

European Office Action dated Dec. 11, 2025 issued in the corresponding European Patent Application No. 21923291.5.

Chinese Office Action dated Dec. 25, 2025 issued in the corresponding Chinese Patent Application No. 202180090557.7, with English translation.

* cited by examiner

*FIG. 2*

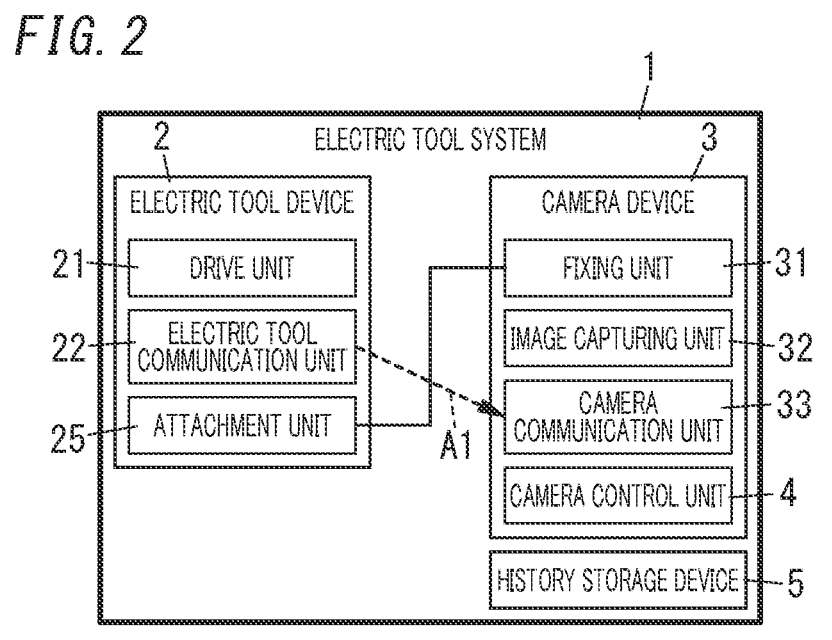

ELECTRIC TOOL SYSTEM   1

| | |
|---|---|
| 2 ELECTRIC TOOL DEVICE | 3 CAMERA DEVICE |
| 21 — DRIVE UNIT | FIXING UNIT — 31 |
| 22 — ELECTRIC TOOL COMMUNICATION UNIT | IMAGE CAPTURING UNIT — 32 |
| 25 — ATTACHMENT UNIT | CAMERA COMMUNICATION UNIT — 33 |
| | CAMERA CONTROL UNIT — 4 |
| A1 | HISTORY STORAGE DEVICE — 5 |

FIG. 4

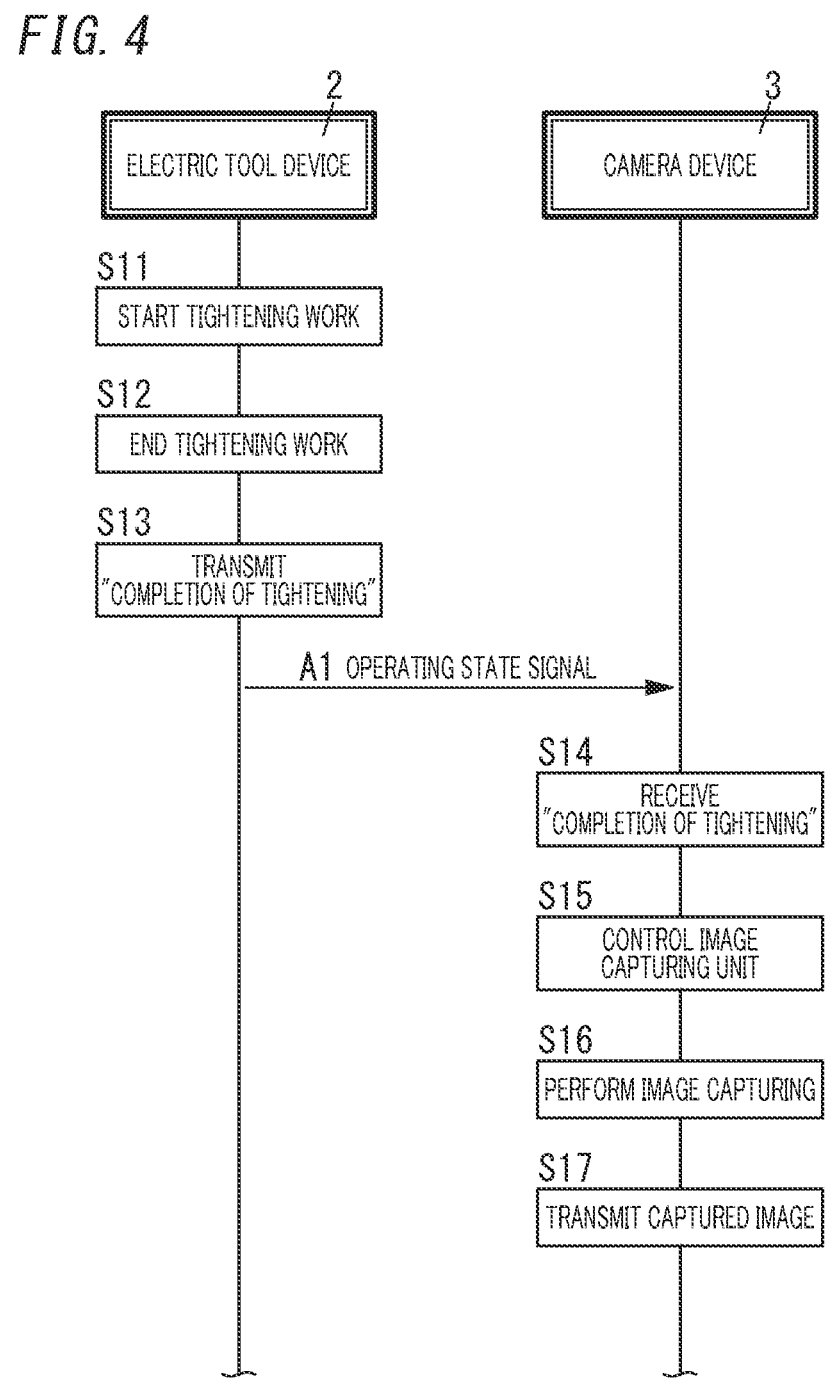

2
ELECTRIC TOOL DEVICE

3
CAMERA DEVICE

S11
START TIGHTENING WORK

S12
END TIGHTENING WORK

S13
TRANSMIT
"COMPLETION OF TIGHTENING"

A1 OPERATING STATE SIGNAL

S14
RECEIVE
"COMPLETION OF TIGHTENING"

S15
CONTROL IMAGE
CAPTURING UNIT

S16
PERFORM IMAGE CAPTURING

S17
TRANSMIT CAPTURED IMAGE

Figure 12:
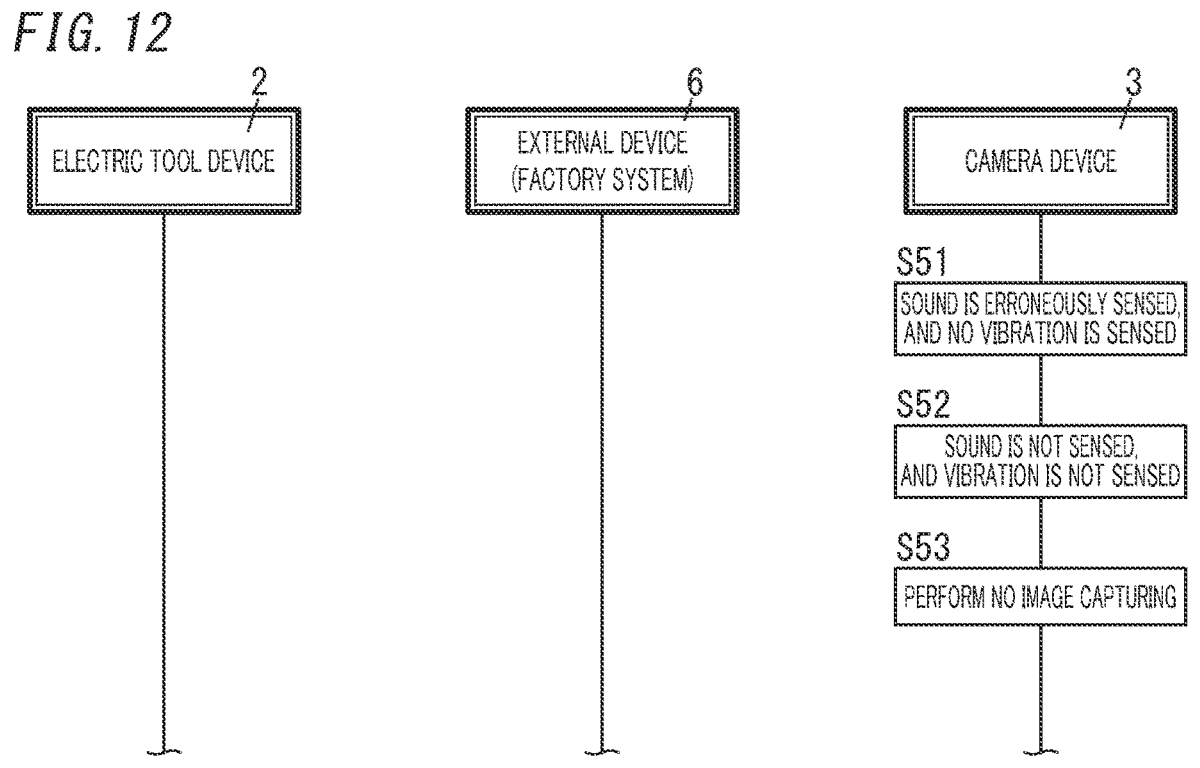

| ELECTRIC TOOL DEVICE | EXTERNAL DEVICE (FACTORY SYSTEM) | CAMERA DEVICE |
|---|---|---|
| 2 | 6 | 3 |

S51
SOUND IS ERRONEOUSLY SENSED, AND NO VIBRATION IS SENSED

S52
SOUND IS NOT SENSED, AND VIBRATION IS NOT SENSED

S53
PERFORM NO IMAGE CAPTURING

FIG. 13

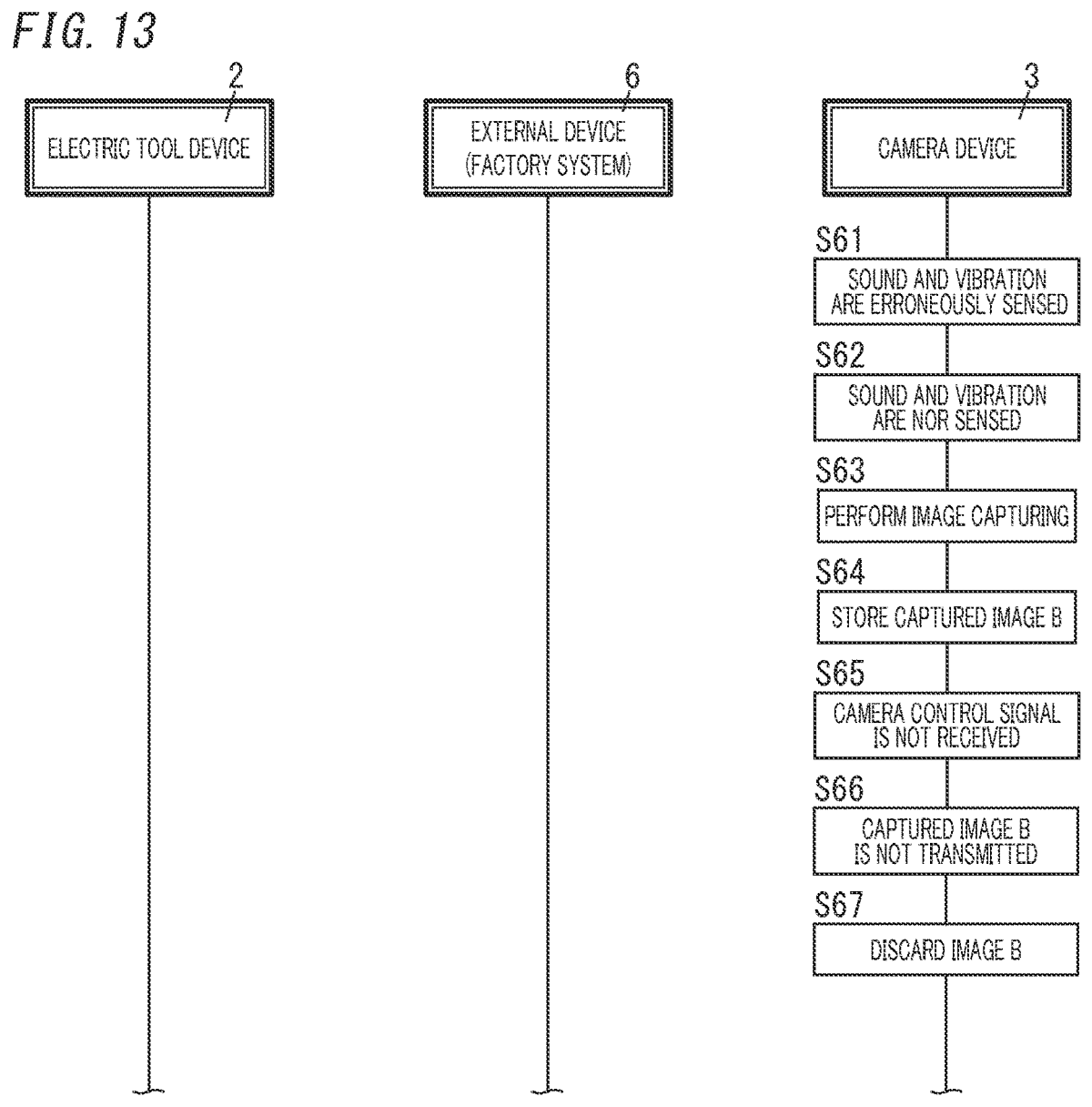

| ELECTRIC TOOL DEVICE | 2 | EXTERNAL DEVICE (FACTORY SYSTEM) | 6 | CAMERA DEVICE | 3 |

S61
SOUND AND VIBRATION ARE ERRONEOUSLY SENSED

S62
SOUND AND VIBRATION ARE NOR SENSED

S63
PERFORM IMAGE CAPTURING

S64
STORE CAPTURED IMAGE B

S65
CAMERA CONTROL SIGNAL IS NOT RECEIVED

S66
CAPTURED IMAGE B IS NOT TRANSMITTED

S67
DISCARD IMAGE B

ELECTRIC TOOL SYSTEM, ELECTRIC TOOL DEVICE, AND CAMERA DEVICE

CROSS-REFERENCE OF RELATED APPLICATIONS

This application is the U.S. National Phase under 35 U.S.C. § 371 of International Patent Application No. PCT/JP2021/048630, filed on Dec. 27, 2021, which in turn claims the benefit of Japanese Patent Application No. 2021-012422, filed on Jan. 28, 2021, the entire disclosures of which Applications are incorporated by reference herein.

TECHNICAL FIELD

The present disclosure generally relates to an electric tool system, an electric tool device, and a camera device. More particularly, the present disclosure relates to an electric tool system that tightens a tightening component to a work target, an electric tool device, and a camera device.

BACKGROUND ART

In Patent Literature 1, a tool system is disclosed. This tool system includes a portable tool and a specification unit. The tool has an image capturing unit that generates a captured image, and the specification unit specifies in a non-contact manner a work target in which the tool is set on the basis of the captured image.

The tool (electric tool device) described in Patent Literature 1 includes the image capturing unit (camera device). In general, a service life of the tool is shorter than a service life of the image capturing unit and therefore, when the tool reaches an end of the service life thereof and cannot be used any longer, a problem arises in that the image capturing unit is not effectively used, though an end of the service life thereof has not been reached yet.

CITATION LIST

Patent Literature

Patent Literature 1: JP 2018-108633 A

SUMMARY OF INVENTION

An object of the present disclosure is to provide an electric tool system that allows an electric tool device and a camera device to be effectively used.

An electric tool system according to an aspect of the present disclosure includes an electric tool device and a camera device. The electric tool device has a drive unit and an electric tool communication unit. The drive unit performs tightening work of tightening a tightening component to a work target using power from a power source. The electric tool communication unit performs communication with outside. The camera device has a fixing unit, an image capturing unit, and a camera communication unit. The fixing unit is removably attached to the electric tool device. The image capturing unit captures an image of at least the work target. The camera communication unit performs communication with the outside.

An electric tool device according to an aspect of the present disclosure has a drive unit, an electric tool communication unit, and an attachment unit. The drive unit tightens a tightening component to a work target using power from a power source. The electric tool communication unit communicates with outside. The attachment unit allows a camera device that captures an image of at least the work target to be removably attached.

A camera device according to an aspect of the present disclosure captures an image of a work target to which a tightening component is to be tightened by a drive unit of an electric tool device using power from a power source, and has a fixing unit and a camera communication unit. The fixing unit is removably attached to the electric tool device. The camera communication unit communicates with outside.

BRIEF DESCRIPTION OF DRAWINGS

FIG. 2 is a block diagram illustrating another schematic configuration of the same electric tool system as above;

FIG. 3A is a schematic diagram of an electric tool device, while

FIG. 4 is a sequence diagram illustrating an operation of the same electric tool system as above;

FIG. 6 is a block diagram illustrating a schematic configuration of the electric tool system according to a second embodiment;

FIG. 10 is a block diagram illustrating a schematic configuration of the electric tool system according to a fourth embodiment;

FIG. 12 is a sequence diagram illustrating another operation of the same electric tool system as above;

FIG. 13 is a sequence diagram illustrating still another operation of the same electric tool system as above;

DESCRIPTION OF EMBODIMENTS

First Embodiment (1-1) Overview

Figure 1:
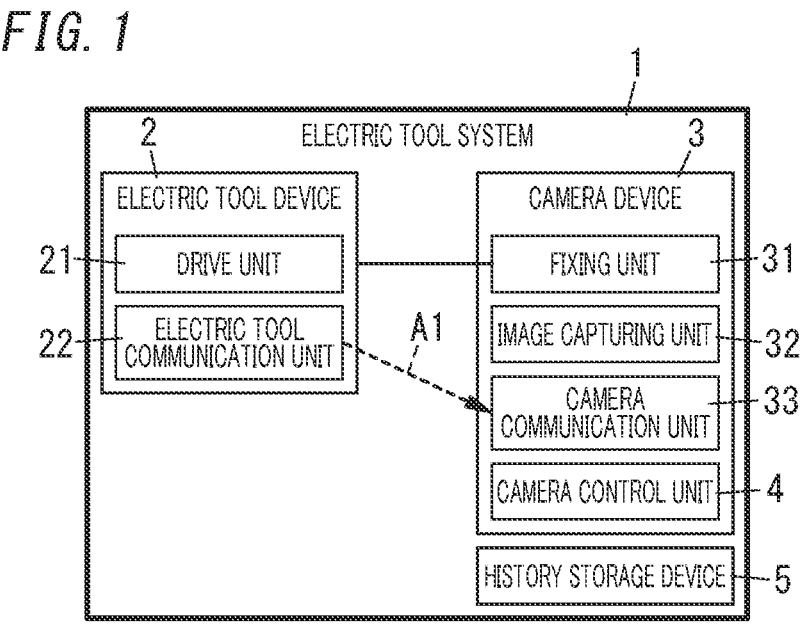
FIG. 1 is a block diagram illustrating a schematic configuration of an electric tool system according to a first embodiment.

Referring to FIGS. 1 and 2, a description will be given of an overview of an electric tool system 1 according to an embodiment.

As illustrated in FIG. 1, the electric tool system 1 according to the present embodiment includes an electric tool device 2 and a camera device 3. The electric tool system 1 in the present embodiment is used in, e.g., an assembly line that performs product assembly work in a factory. A use purpose of the electric tool system 1 is not limited to the assembly line mentioned above, and may also be another use purpose.

Examples of a work target on which work is to be performed using the electric tool device 2 include an electric appliance, furniture, and the like. In the present embodiment, it is assumed that the work target has a plurality of tightening target portions and that a worker performs tightening work of tightening respective tightening components to the plurality of tightening target portions by using the electric tool device 2. Specifically, tightening equipment is a screw, a bolt, a nut, or the like, while each of the tightening target portions is a screw hole into which the tightening equipment is to be tightened or the like. As illustrated in FIG. 3, the present embodiment will be described below on the assumption that the electric tool device 2 has a cylindrical body portion 23 and a grip 24 radially projecting from a peripheral surface of the body portion 23.

The electric tool device 2 has a drive unit 21 and an electric tool communication unit 22. The drive unit 21 responds to an operation of the worker to perform the tightening work of tightening the tightening components to the work target with power from a power source such as a motor. The electric tool communication unit 22 communicates with the outside to transmit an operating state of the drive unit 21 to the camera device 3.

The camera device 3 has a fixing unit 31, an image capturing unit 32, and a camera communication unit 33. The fixing unit 31 detachably fixes the camera device 3 to the electric tool device 2. The image capturing unit 32 captures an image of at least the work target. In the present embodiment, the image capturing unit 32 captures an image of the work target around the tightening target portions on which the tightening work is to be performed. The camera communication unit 33 communicates with the outside to receive, from the electric tool communication unit 22, information related to the operating state of the drive unit 21.

In addition, the camera device 3 further has a camera control unit 4 that controls at least one of the image capturing unit 32 and the camera communication unit 33. In the present embodiment, the camera control unit 4 controls the image capturing unit 32 on the basis of the operating state of the drive unit 21 received by the camera communication unit 33 to cause the image capturing unit 32 to generate a captured image.

From the above, in the present embodiment, when the electric tool device 2 or the camera device 3 cannot be used any longer due to a factor such as an end of service life or failure, the electric tool device 2 or the camera device 3 can be individually replaced. Therefore, the electric tool system 1 in the present embodiment has an advantage that the electric tool device 2 and the camera device 3 can effectively be used.

(1-2) Details

Referring to FIGS. 1 to 4, a description will be given below of a detailed configuration of the electric tool system 1 in the present embodiment.

As illustrated in FIG. 1, the electric tool system 1 in the present embodiment includes the electric tool device 2 and the camera device 3.

For example, the electric tool device 2 is an electric impact wrench, and is capable of the tightening work of tightening the tightening components to the work target. In the present embodiment, the electric tool device 2 has the drive unit 21 and the electric tool communication unit 22. Alternatively, as illustrated FIG. 2, the electric tool device 2 may also further have an attachment unit 25 for allowing the camera device 3 that captures an image of the work target to be removably attached.

The drive unit 21 can perform the tightening work of tightening the tightening components to the work target with the power from the power source. In the present embodiment, the drive unit 21 has the motor serving as the power source, and is configured to perform a rotating operation with the power from the motor. By performing the rotating operation, the drive unit 21 is allowed to perform work such as tightening or untightening of the tightening components. The drive unit 21 outputs an operating state signal A1 representing the operating state to the electric tool communication unit 22.

The electric tool communication unit 22 is configured to be able to communicate with the outside. The electric tool communication unit 22 is a communication module capable of wireless communication via, e.g., Bluetooth (registered trademark), Wi-Fi (registered trademark), or the like. In the present embodiment, it is assumed that the outside with which the electric tool communication unit 22 communicates is a device other than the electric tool communication unit 22. The electric tool communication unit 22 communicates with the camera communication unit 33, and transmits the operating state signal A1 representing the operating state of the drive unit 21 to the camera communication unit 33. Specifically, when the drive unit 21 completes the tightening work, the operating state signal A1 representing the completion of the tightening is transmitted to the camera communication unit 33.

The fixing unit 31 fixes the camera device 3 to the electric tool device 2. The fixing unit 31 in the present embodiment has at least one of an engagement structure to be engaged with the electric tool device 2, an interfitting structure to be interfitted into the attachment unit 25 of the electric tool device 2, a holding structure that holds the attachment unit 25, and the like.

Figure 3A:
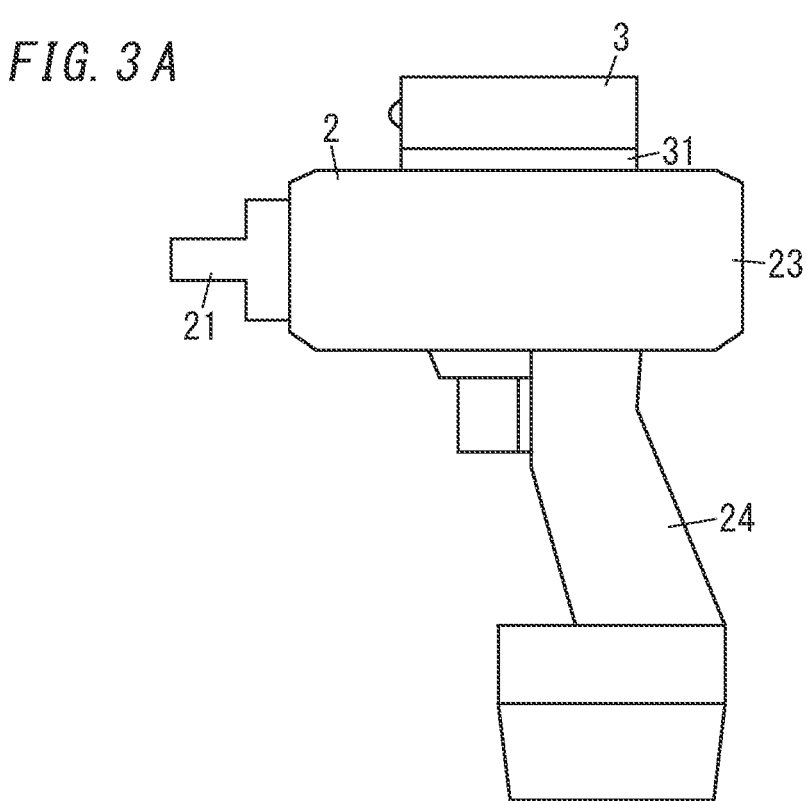
Figure 3B:
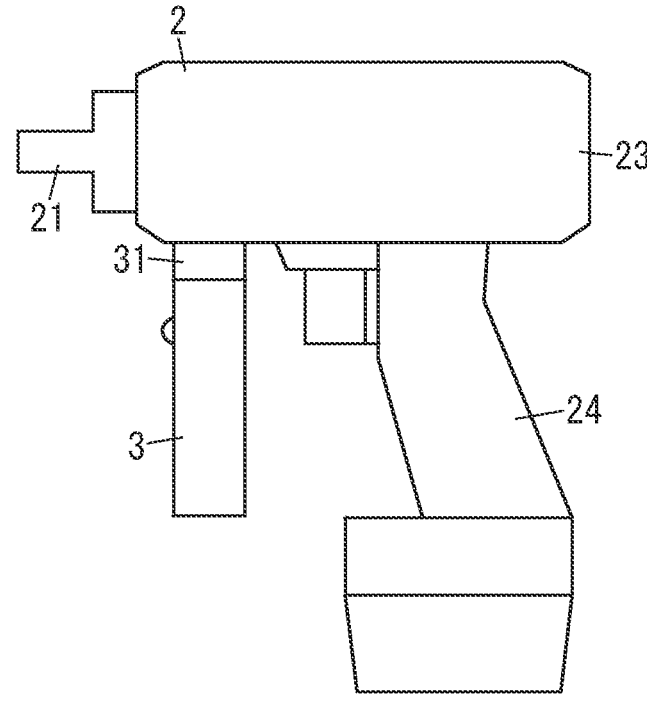
FIG. 3B is another schematic diagram of the electric tool device.

A position where the fixing unit 31 fixes the camera device 3 to the electric tool device 2 may be any position in the electric tool device 2 as long as the image capturing unit 32 can capture an image of at least the work target. For example, the fixing unit 31 may fix the camera device 3 to an upper portion of the body portion 23 of the electric tool device 2 as illustrated in FIG. 3A, or the camera device 3 may be provided below the body portion 23 of the electric tool device 2 and also on a front side of the body portion 23 as illustrated in FIG. 3B.

The electric tool system 1 further includes the camera control unit 4 that controls at least one of the image capturing unit 32 and the camera communication unit 33 on the basis of the operating state of the drive unit 21. The camera control unit 4 preferably includes a computer system. In the computer system, a processor such as a CPU (Central Processing Unit) or a MPU (Micro Processing Unit) reads and executes a program stored in a memory to implement some or all of functions of the camera control unit 4. The computer system includes the processor that operates according to the program as a main hardware configuration. The processor may be of any type as long as the functions can be implemented through the execution of the program. The processor includes one or a plurality of electronic circuits each including a semiconductor integrated circuit (IC) or an LSI (Large Scale Integration). The IC or LSI is referred to as such herein, but how the electronic circuit is referred to differs depending on a degree of integration, and the electronic circuit may also be that referred to as a system LSI, a VLSI (Very Large Scale Integration), or a ULSI (Ultra Large Scale Integration). A field programmable gate array (FPGA) that is programmed after manufacturing of the LSI or a reconfigurable logic device in which a junction relationship in the LSI can be reconfigured or a circuit partition in the LSI can be set up can also be used for the same purpose. The plurality of electronic circuits may be integrated in one chip or may also be provided in a plurality of chips. The plurality of chips may be integrated in one device, or may also be provided in a plurality of devices.

In the present embodiment, the camera device 3 has the camera control unit 4, and the camera control unit 4 controls, on the basis of the operating state signal A1 received by the camera communication unit 33, at least one of the image capturing unit 32 and the camera communication unit 33.

For example, the image capturing unit 32 is configured to include a camera having an image capturing element and a lens. The image capturing unit 32 captures an image of at least the work target. In the present embodiment, the image capturing unit 32 captures an image of each of the work target and the tightening components. Specifically, the image capturing unit 32 generates, on the basis of the control of the camera control unit 4, the captured image including each of the work target for which the tightening work has been completed and the tightening components in an image capturing range. On the basis of the captured image generated by the image capturing unit 32, a person who manages the tightening work can check whether or not the drive unit 21 has normally attached the tightening equipment to the work target.

The camera communication unit 33 is configured to be able to communicate with the outside and receive information related to the operating state of the drive unit 21 from the electric tool communication unit 22. The camera communication unit 33 is a communication module capable or wireless communication via, e.g., Bluetooth (registered trademark), Wi-Fi (registered trademark), or the like. In the present embodiment, the outside with which the camera communication unit 33 communicates is a device other than the camera communication unit 33, such as the electric tool communication unit 22 or an information terminal possessed by the worker. The camera communication unit 33 communicates with the electric tool communication unit 22 to receive the operating state signal A1 from the electric tool communication unit 22.

The electric tool system 1 further includes a history storage device 5 that stores history information of the tightening work. The history storage device 5 stores the captured image generated by the image capturing unit 32 as the history information of the tightening work. In the present embodiment, as the history storage device 5, a server having a storage device and a communication device is assumed. Examples of the storage device include a magnetic core memory, a semiconductor memory, and the like. The communication device needs only to be communicative with the camera communication unit 33 via a wide area network such as the Internet. A communication method between the communication device and the camera communication unit 33 may be wireless communication using an electric wave as a medium which is based on communication standards of Wi-Fi (registered trademark) or the like. Alternatively, the communication method between the communication device and the camera communication unit 33 may also be wired communication based on communication standards of a wired LAN (Local Area Network) or the like. In the present embodiment, the camera communication unit 33 transmits, on the basis of the control of the camera control unit 4, the captured image generated by the image capturing unit 32 to the history storage device 5.

(1-3) Operation

Using a sequence diagram of FIG. 4, a description will be given of an operation of the electric tool system 1 in the present embodiment.

First, the drive unit 21 starts the tightening work (S11). After the drive unit 21 completes the tightening work (S12), the electric tool communication unit 22 transmits the operating state signal A1 representing the completion of the tightening to the camera communication unit 33 (S13).

Then, the camera communication unit 33 receives the operating state signal A1 from the electric tool communication unit 22 (S14). The camera control unit 4 checks the completion of the tightening work on the basis of the operating state signal A1 received by the camera communication unit 33, and controls the image capturing unit 32 (S15). Then, the image capturing unit 32 captures an image of the work target for which the tightening work has been completed on the basis of the control of the camera control unit 4 to generate the captured image (S16).

Then, the camera communication unit 33 transmits, on the basis of the control of the camera control unit 4, the captured image generated by the image capturing unit 32 to the history storage device 5 (S17). Thus, the electric tool system 1 can store, in the history storage device 5, the captured image generated by the image capturing unit 32 as the history information of the tightening work.

The sequence diagram of FIG. 4 is a mere example of the operation of the electric tool system 1 in the present embodiment, an order of processing thereof may be changed as appropriate, or any processing may be omitted as appropriate.

(1-4) Modifications

The embodiment described above is merely one of various embodiments of the present disclosure. The embodiment described above can variously be modified depending on design or the like as long as the object of the present disclosure can be attained.

Figure 5:
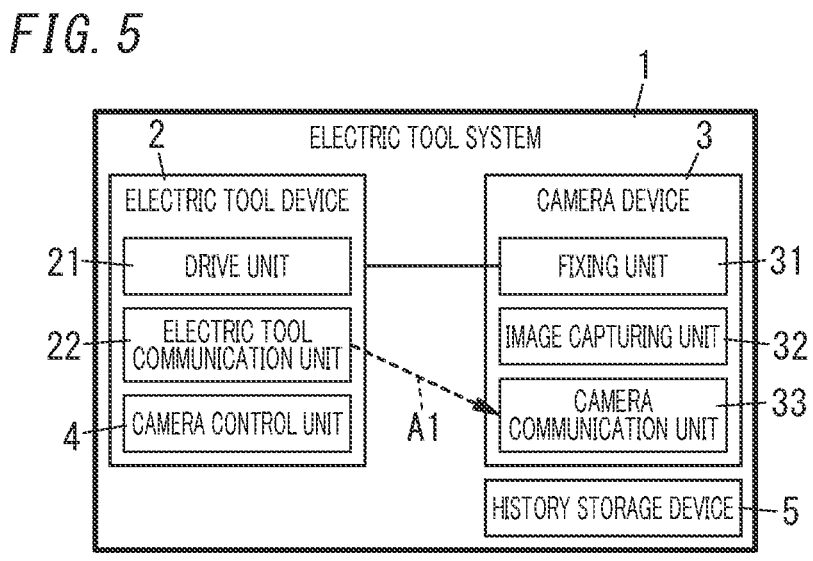
FIG. 5 is a block diagram illustrating a schematic configuration of the same electric tool system as above according to a modification.

In the embodiment described above, as illustrated in FIG. 5, it may also be possible that the camera device 3 does not have the camera control unit 4, and the electric tool device 2 has the camera control unit 4. In this case, the drive unit 21 outputs the operating state signal A1 representing the operating state to the camera control unit 4, and the camera control unit 4 produces a camera control signal A2 that controls at least one of the image capturing unit 32 and the camera communication unit 33 on the basis of the operating state signal A1 representing the operating state of the drive unit 21. Then, the electric tool communication unit 22 transmits the camera control signal A2 to the camera communication unit 33. The image capturing unit 32 captures, on the basis of the camera control signal A2, an image of each of the work target for which the tightening work has been completed and the tightening components, and the camera communication unit 33 transmits the captured image generated by the image capturing unit 32 to the history storage device 5.

The image capturing unit 32 according to an aspect may also generate a captured image including, in the image capturing range, the work target before the tightening work is started in addition to the captured image including the work target after the drive unit 21 completes the tightening work in the image capturing range. In this case, the captured images each different in photographing timing are stored in the history storage device 5. This allows a person who manages the tightening work to more precisely check whether or not the drive unit 21 has normally attached the tightening equipment to the work target.

The history storage device 5 according to an aspect may also be provided in the camera device 3. In this case, as the history storage device 5, a semiconductor memory such as, e.g., a flash memory is assumed. Alternatively, the history storage device 5 may also be a memory card detachable from the camera device 3. The camera communication unit 33 need not transmit the captured image generated by the image capturing unit 32 to the history storage device 5, and the history storage device 5 can store the captured image generated by the image capturing unit 32 without interposition of the camera communication unit 33.

Still alternatively, the history storage device 5 according to an aspect may also be provided in the electric tool device 2. The camera communication unit 33 transmits the captured image generated by the image capturing unit 32 to the electric tool communication unit 22. Then, the history storage device 5 can store the captured image generated by the image capturing unit 32 via the electric tool communication unit 22.

Second Embodiment (2-1) Overview

The electric tool system 1 according to a second embodiment includes an external communication device 6 having an external communication unit 61 and the camera control unit 4, and is different from the electric tool system 1 according to the first embodiment in that the electric tool device 2 and the camera device 3 perform communication via the external communication device 6.

(2-2) Details

Figure 6:
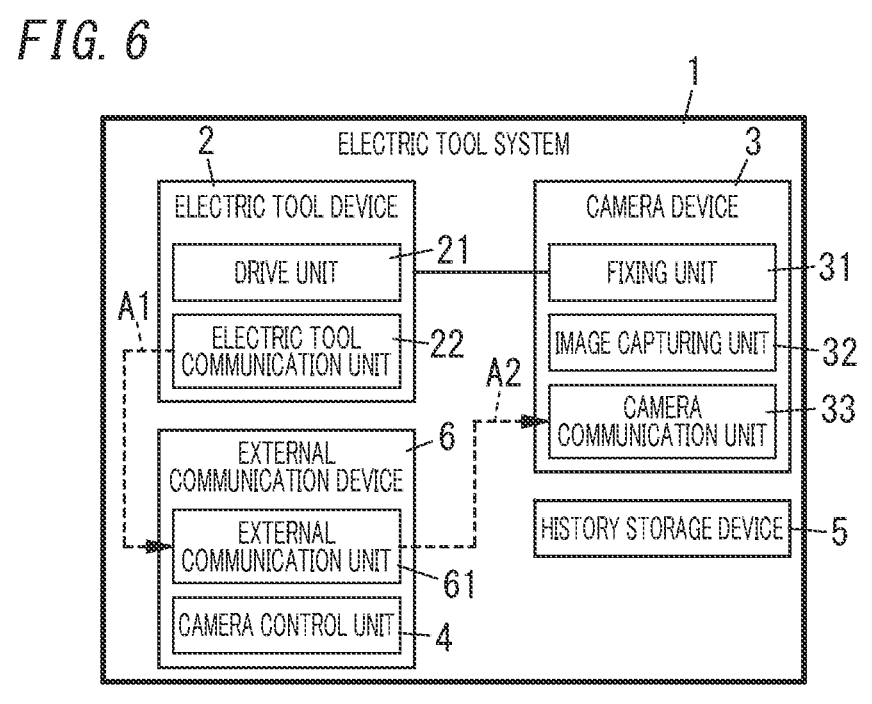

Referring to FIG. 6, a description will be given below of a detailed configuration of the electric tool system 1 according to the second embodiment.

The electric tool system 1 in the present embodiment includes the electric tool device 2 having the drive unit 21 and the electric tool communication unit 22, the camera device 3 having the fixing unit 31, the image capturing unit 32, and the camera communication unit 33, and the external communication device 6 having the external communication unit 61 and the camera control unit 4. Note that the drive unit 21 and the fixing unit 31 of the electric tool system 1 in the second embodiment are the same as the drive unit 21 and the fixing unit 31 of the electric tool system 1 in the first embodiment, and therefore a description thereof is omitted.

The electric tool communication unit 22 communicates with the external communication unit 61 to transmit the operating state signal A1 representing the operating speed of the drive unit 21 to the external communication unit 61. Specifically, when the drive unit 21 completes the tightening work, the electric tool communication unit 22 transmits the operating state signal A1 representing the completion of the tightening to the external communication unit 61.

The external communication unit 61 is a communication module capable of wireless communication via, e.g., Bluetooth (registered trademark), Wi-Fi (registered trademark), or the like. The external communication unit 61 in the present embodiment is configured to be communicative with both of the electric tool communication unit 22 and the camera communication unit 33.

The camera control unit 4 produces, on the basis of the operating state signal A1 received by the external communication unit 61 from the electric tool communication unit 22, the camera control signal A2 that controls at least one of the image capturing unit 32 and the camera communication unit 33. In the present embodiment, the camera control unit 4 produces, on the basis of the operating state signal A1, the camera control signal A2 that controls the image capturing unit 32. Then, the external communication unit 61 transmits the camera control signal A2 to the camera communication unit 33.

The image capturing unit 32 captures, on the basis of the camera control signal A2 received by the camera communinication unit 33, an image of each of the work target for which the tightening work has been completed and the tightening components.

The camera communication unit 33 transmits the captured image generated by the image capturing unit 32 to the history storage device 5.

The electric tool system 1 in the present embodiment further includes the history storage device 5 that stores the captured image generated by the image capturing unit 32 as the history information of the tightening work performed by the drive unit 21. The camera communication unit 33 transmits the captured image generated by the image capturing unit 32 to the history storage device 5.

The configuration of the electric tool system 1 according to the second embodiment can appropriately be combined with the configuration of the first embodiment (including the modifications).

(2-3) Operation

Using a sequence diagram of FIG. 7, a description will be given of the operation of the electric tool system 1 in the present embodiment.

First, the drive unit 21 starts the tightening work (S21). After the drive unit 21 completes the tightening work (S22), the electric tool communication unit 22 transmits the operating state signal A1 representing the completion of the tightening to the external communication unit 61 (S23).

Then, the external communication unit 61 receives the operating state signal A1 from the electric tool communication unit 22 (S24). The camera control unit 4 checks the completion of the tightening work on the basis of the operating state signal A1 received by the external communication unit 61 and produces the camera control signal A2 that controls the image capturing unit 32 (S25). Then, the external communication unit 61 transmits the camera control signal A2 to the camera communication unit 33 (S26).

After the camera communication unit 33 receives the camera control signal A2 (S27), the image capturing unit 32 captures, on the camera control signal A2, an image of each of the work target for which the tightening work has been completed and the tightening components (S28). Then, the camera communication unit 33 transmits the captured image generated by the image capturing unit 32 to the history storage device 5 (S29). This allows the captured image generated by the image capturing unit 32 of the camera device 3 detachable from the electric tool device 2 to be stored as the history information of the tightening work performed by the drive unit 21 in the history storage device 5.

Figure 7:
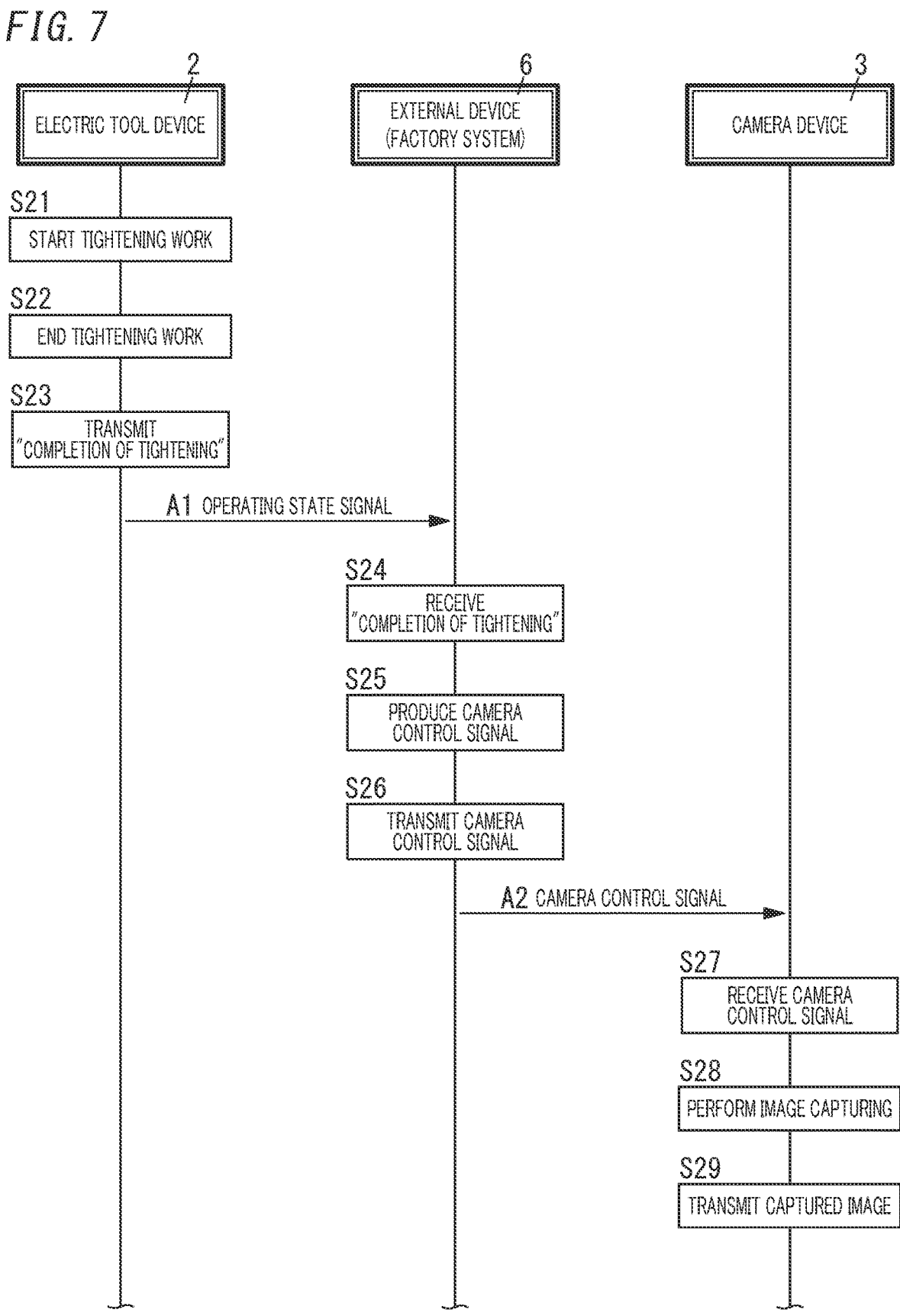
FIG. 7 is a sequence diagram illustrating an operation of the same electric tool system as above.

The sequence diagram of FIG. 7 is a mere example of the operation of the electric tool system 1 in the present embodiment, an order of processing thereof may be changed as appropriate, or any processing may be omitted as appropriate.

Third Embodiment (3-1) Overview

The electric tool system 1 according to the third embodiment is different from the electric tool system 1 according to the first embodiment in that the camera device 3 has at least one of a sound sensor 34 and a vibration sensor 35 that sense the operating state of the drive unit 21.

(3-2) Details

Figure 8:
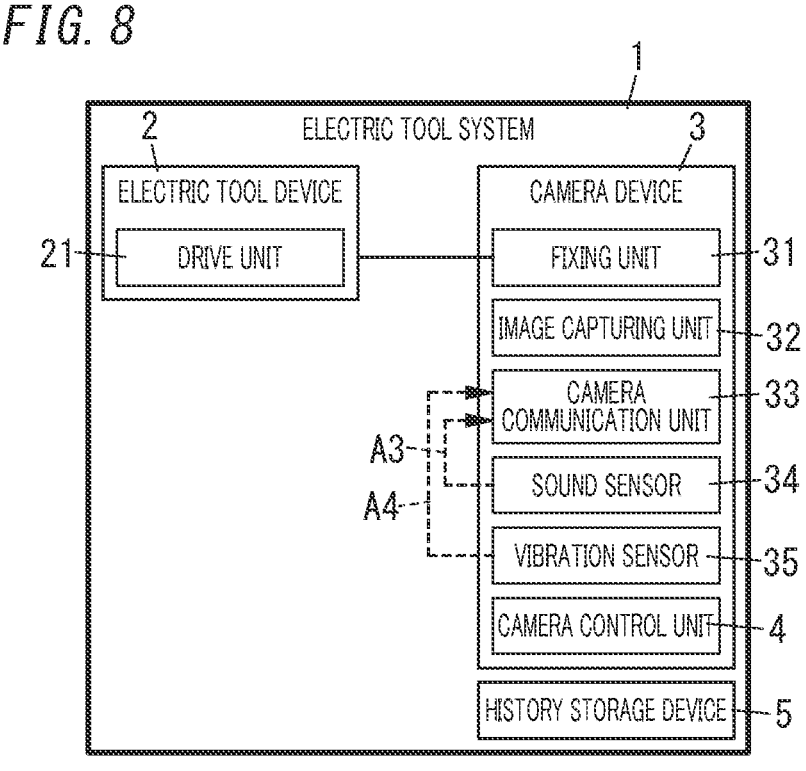
FIG. 8 is a block diagram illustrating a schematic configuration of the electric tool system according to a third embodiment.

Referring to FIG. 8, a description will be given of a detailed configuration of the electric tool system 1 according to the third embodiment.

The electric tool system 1 in the present embodiment includes: the electric tool device 2 having the drive unit 21; and the camera device 3 having the fixing unit 31, the image capturing unit 32, the camera communication unit 33, at least one of the sound sensor 34 and the vibration sensor 35 and the camera control unit 4. Note that, in the present embodiment, both of the sound sensor 34 and the vibration sensor 35 are included. The drive unit 21 and the fixing unit 31 of the electric tool system 1 in the third embodiment are the same as the drive unit 21 and the fixing unit 31 of the electric tool system 1 in the first embodiment, and therefore a description thereof is omitted.

The sound sensor 34 and the vibration sensor 35 sense the operating state of the drive unit 21.

The sound sensor 34 is configured to be able to sense a sound produced when the drive unit 21 performs the tightening work. The sound sensor 34 needs only to be a device that converts a sound to an electric signal, and may also be, e.g., a microphone or the like. When sensing a sound, the sound sensor 34 transmits a sound detection signal A3 to the camera control unit 4. Specifically, the sound sensor 34 continues to transmit the sound detection signal A3 while continuing to sense a sound, and stops the sound detection signal A3 when no sound is sensed any longer.

The vibration sensor 35 is configured to be able to sense vibration produced when the drive unit 21 performs the tightening work. The vibration sensor 35 needs only to be a device that converts vibration to an electric signal, and may also be, e.g., a speed sensor, an acceleration sensor, a gyro sensor, or the like. When sensing vibration, the vibration sensor 35 transmits a vibration detection signal A4 to the camera control unit 4. Specifically, the vibration sensor 35 continues to transmit the vibration detection signal A4 while continuing to sense vibration, and stops the vibration detection signal A4 when no vibration is sensed any longer.

In the present embodiment, the camera control unit 4 controls the image capturing unit 32 at the time of transition from a state where both of the sound detection signal A3 and the vibration detection signal A4 are output to a stopped state. Then, the image capturing unit 32 captures an image of each of the work target for which the tightening work has been completed and the tightening components.

The electric tool system 1 in the present embodiment further includes the history storage device 5 that stores the captured image generated by the image capturing unit 32 as the history information of the tightening work performed by the drive unit 21. The camera control unit 4 controls the camera communication unit 33 such that the captured image generated by the image capturing unit 32 is transmitted to the history storage device 5.

The configuration of the electric tool system 1 according to the third embodiment can appropriately be combined with the configuration of the first embodiment (including the modifications).

(3-3) Operation

Using a sequence diagram of FIG. 9, a description will be given of the operation of the electric tool system 1 in the present embodiment.

First, the drive unit 21 starts the tightening work, and a sound and vibration are generated (S31). The sound sensor 34 senses the sound of the tightening work and transmits the sound detection signal A3 to the camera control unit 4. Likewise, the vibration sensor 35 senses the vibration of the tightening work and transmits the vibration detection signal A4 to the camera control unit 4 (S32).

Then, the drive unit 21 completes the tightening work, and the sound and vibration stop (S33). The sound sensor 34 no longer senses the sound of the tightening work, and stops the sound detection signal A3. Likewise, the vibration sensor 35 no longer senses the vibration of the tightening work, and stops the vibration detection signal A4 (S34).

Then, the camera control unit 4 controls the image capturing unit 32 at the time of transition from the state where both of the sound detection signal A3 and the vibration detection signal A4 are output to the stopped state. Then, the image capturing unit 32 captures, on the basis of the control of the camera control unit 4, an image of each of the work target for which the tightening work has been completed and the tightening components (S35). The camera communication unit 33 transmits the captured image generated by the image capturing unit 32 to the history storage device 5 (S36). This allows the captured image generated by the image capturing unit 32 of the camera device 3 detachable from the electric tool device 2 to be stored as the history information of the tightening work performed by the drive unit 21 in the history storage device 5.

Figure 9:
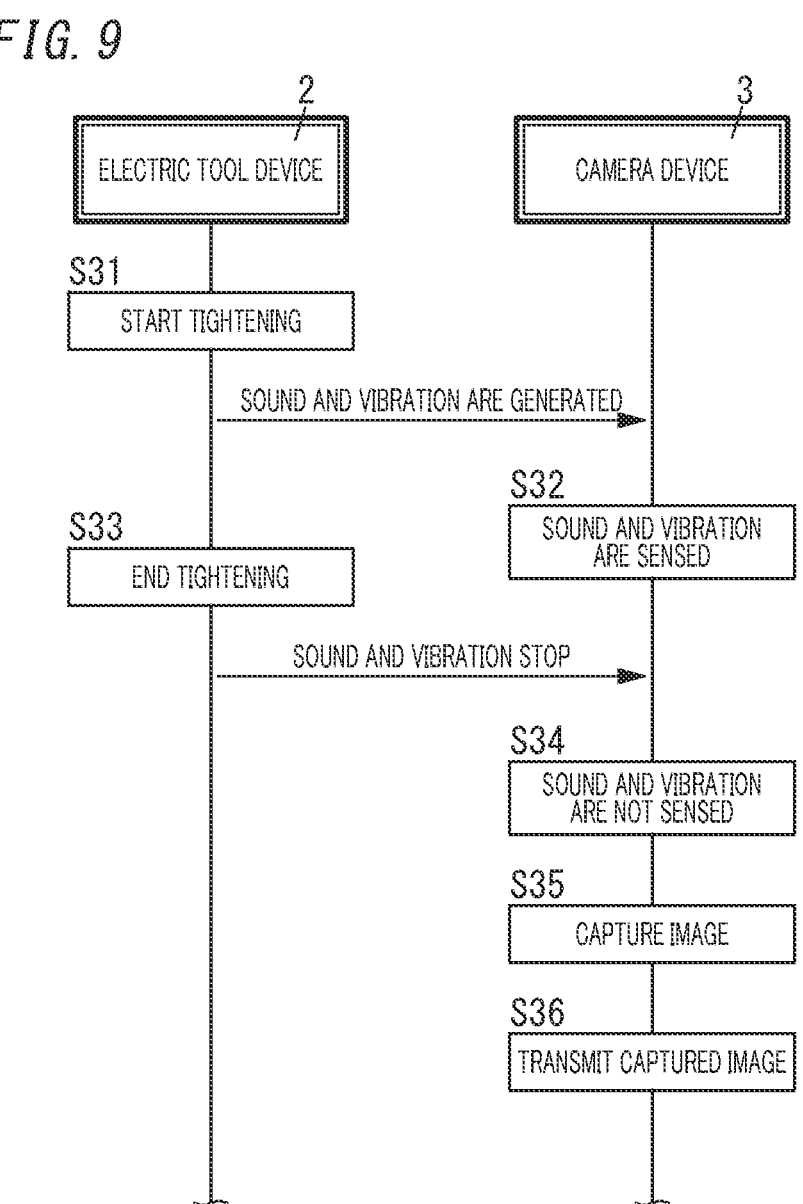
FIG. 9 is a sequence diagram illustrating an operation of the same electric tool system as above.

The sequence diagram of FIG. 9 is a mere example of the operation of the electric tool system 1 in the present embodiment, an order of processing thereof may be changed as appropriate, or any processing may be omitted as appropriate.

Fourth Embodiment (4-1) Overview

The electric tool system 1 according to the fourth embodiment is different from the electric tool system 1 according to the first embodiment in that the camera device 3 has at least one of the sound sensor 34 and the vibration sensor 35 that sense the operating state of the drive unit 21 and a camera storage unit 37.

In addition, the electric tool system 1 according to the fourth embodiment is also different from the electric tool system 1 according to the first embodiment in that the external communication device 6 having the external communication unit 61 and the camera control unit 4 is included therein, and the electric tool device 2 and the camera device 3 communicate with each other via the external communication device 6.

(4-2) Details

Figure 10:
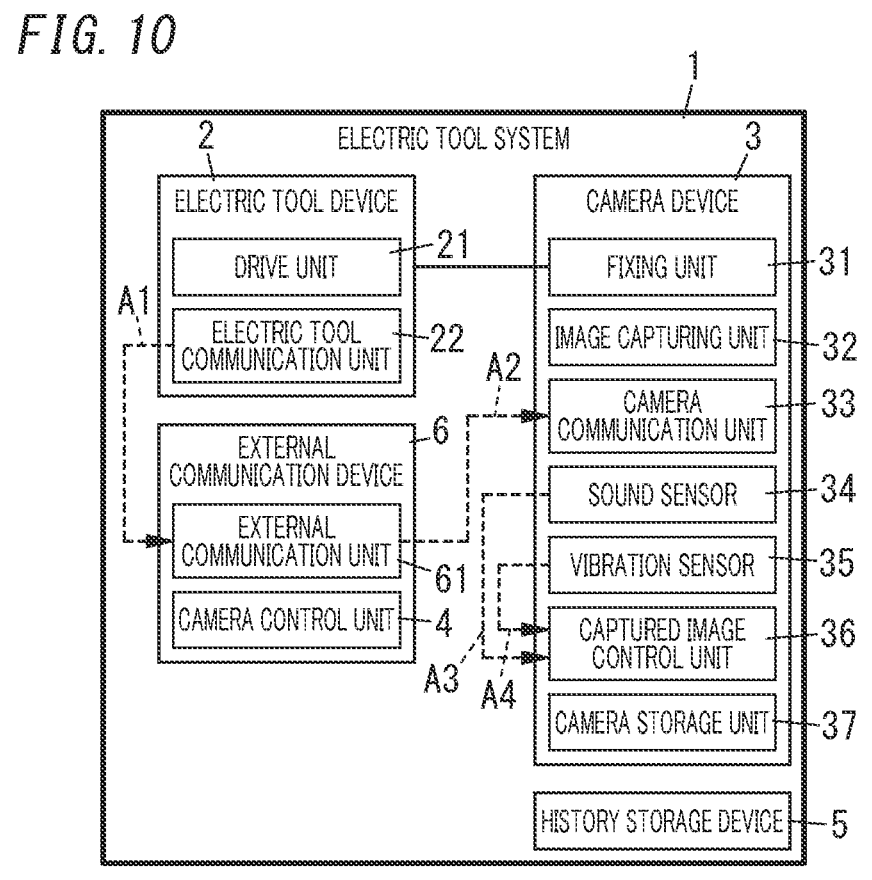

Referring to FIG. 10, a description will be given of a detailed configuration of the electric tool system 1 according to the fourth embodiment.

The electric tool system 1 in the present embodiment includes the electric tool device 2, the camera device 3, and the external communication device 6. The electric tool device 2 has the drive unit 21 and the electric tool communication unit 22. The camera device 3 has the fixing unit 31, the image capturing unit 32, the camera communication unit 33, at least one of the sound sensor 34 and the vibration sensor 35, an image capturing control unit 36, and the camera storage unit 37. Note that, in the present embodiment, the electric tool system 1 includes both of the sound sensor 34 and the vibration sensor 35. The drive unit 21 and the fixing unit 31 of the electric tool system 1 in the fourth embodiment are the same as the drive unit 21 and the fixing unit 31 of the electric tool system 1 in the first embodiment, and therefore a description thereof is omitted.

The sound sensor 34 or the vibration sensor 35 senses the operating state of the drive unit 21. In the present embodiment, both of the sound sensor 34 and the vibration sensor 35 sense the operating state of the drive unit 21.

The sound sensor 34 is configured to be able to sense a sound produced when the drive unit 21 performs the tightening work. The sound sensor 34 needs only to be a device that converts a sound to an electric signal, and may also be, e.g., a microphone or the like. When sensing a sound, the sound sensor 34 transmits the sound detection signal A3 to the image capturing control unit 36. Specifically, the sound sensor 34 continues to transmit the sound detection signal A3 while continuing to sense a sound, and stops the sound detection signal A3 when no sound is sensed any longer.

The vibration sensor 35 is configured to be able to sense vibration produced when the drive unit 21 performs the tightening work. The vibration sensor 35 needs only to be a device that converts vibration to an electric signal, and may also be, e.g., a speed sensor, an acceleration sensor, a gyro sensor, or the like. When sensing vibration, the vibration sensor 35 transmits the vibration detection signal A4 to the image capturing control unit 36. Specifically, the vibration sensor 35 continues to transmit the vibration detection signal A4 while continuing to sense vibration, and stops the vibration detection signal A4 when no vibration is sensed any longer.

The image capturing control unit 36 controls, on the basis of at least one of sensing results from the sound sensor 34 and the vibration sensor 35, the image capturing unit 32 so as to capture an image of at least the work target after the tightening work. Note that the electric tool system 1 in the present embodiment includes both of the sound sensor 34 and the vibration sensor 35 and, accordingly, at the time of transition from the state where both of the sound detection signal A3 and the vibration detection signal A4 are output to the stopped state, the image capturing control unit 36 controls the image capturing unit 32. Then, the image capturing unit 32 generates, on the basis of the control of the image capturing control unit 36, a captured image of each of the work target for which the tightening work has been completed and the tightening components. Meanwhile, when the image capturing control unit 36 does not receive the sound detection signal A3 or the vibration detection signal A4, the image capturing control unit 36 does not control the image capturing unit 32, and the image capturing unit 32 does not perform image capturing.

The image capturing control unit 36 preferably includes a computer system. In the computer system, a processor such as a CPU (Central Processing Unit) or a MPU (Micro Processing Unit) reads and executes a program stored in a memory to implement some or all of the functions of the image capturing control unit 36. The computer system includes the processor that operates according to the program as a main hardware configuration. The processor may be of any type as long as the functions can be implemented through the execution of the program. The processor includes one or a plurality of electronic circuits each including a semiconductor integrated circuit (IC) or an LSI (Large Scale Integration). The IC or LSI is referred to as such herein, but how the electronic circuit is referred to differs depending on a degree of integration, and the electronic circuit may also be that referred to as a system LSI, a VLSI (Very Large Scale Integration), or a ULSI (Ultra Large Scale Integration). A field programmable gate array (FPGA) that is programmed after manufacturing of the LSI or a reconfigurable logic device in which a junction relationship in the LSI can be reconfigured or a circuit partition in the LSI can be set up can also be used for the same purpose. The plurality of electronic circuits may be integrated in one chip or may also be provided in a plurality of chips. The plurality of chips may be integrated in one device, or may also be provided in a plurality of devices.

The camera storage unit 37 stores the captured image generated by the image capturing unit 32 on the basis of at least one of the sensing results from the sound sensor 34 and the vibration sensor 35. The camera storage unit 37 in the present embodiment is configured to store the captured image generated by the image capturing unit 32. Examples of the camera storage unit 37 include a storage device such as a magnetic core memory or a semiconductor memory. Alternatively, the camera storage unit 37 may also be an auxiliary storage device such as an SSD (Solid State Drive) or an HDD (Hard Disk Drive).

The electric tool system 1 in the present embodiment further includes the history storage device 5 that stores the captured image generated by the image capturing unit 32 as the history information of the tightening work performed by the drive unit 21. The camera control unit 4 controls the camera communication unit 33 on the basis of the operating state signal A1 to cause transmission from the camera communication unit 33 to the history storage device 5. Note that, in the present embodiment, the camera control unit 4 determines, on the basis of the operating state signal A1, whether or not the captured image stored in the camera storage unit 37 is to be transmitted from the camera communication unit 33 to the history storage device 5, and produces the camera control signal A2 that controls the camera communication unit 33.

The configuration of the electric tool system 1 according to the fourth embodiment can appropriately be combined with the configuration of the first embodiment (including the modifications).

(4-3) Operation

In the present embodiment, the sound sensor 34 is configured to be able to sense a sound produced when the drive unit 21 performs the tightening work, while the vibration sensor 35 is configured to be able to sense vibration produced when the drive unit 21 performs the tightening work. However, a case where the sound sensor 34 or the vibration sensor 35 performs erroneous sensing can also be considered. Therefore, a description will be given of operations of the electric tool system 1 in the present embodiment when both of the sound sensor 34 and the vibration sensor 35 perform normal sensing, when the sound sensor 34 or the vibration sensor 35 performs erroneous sensing, and when both of the sound sensor and the vibration sensor perform erroneous sensing.

(4-3-1) When Both of Sound Sensor and Vibration Sensor Perform Normal Sensing

Using a sequence diagram of FIG. 11, a description will be given of the operation of the electric tool system 1 in the present embodiment when the sound sensor 34 and the vibration sensor 35 sense a sound and vibration each produced when performing the tightening work.

First, the drive unit 21 starts the tightening work, and a sound and vibration are generated (S41). The sound sensor 34 senses the sound of the tightening work, and transmits the sound detection signal A3 to the camera control unit 4. Likewise, the vibration sensor 35 senses the vibration of the tightening work, and transmits the vibration detection signal A4 to the camera control unit 4 (S42).

Then, the drive unit 21 completes the tightening work, and the sound and vibration stop (S43). The sound sensor 34 no longer senses the sound of the tightening work, and stops the sound detection signal A3 to the camera control unit 4. Likewise, the vibration sensor 35 no longer senses the vibration of the tightening work, and stops the vibration detection signal A4 to the camera control unit 4 (S44).

Then, at the time of transition from the state where both of the sound detection signal A3 and the vibration detection signal A4 are output to the stopped state, the image capturing control unit 36 controls the image capturing unit 32. Then, the image capturing unit 32 captures, on the basis of the control of the image capturing control unit 36, an image of each of the work target to which the tightening components have been tightened and the tightening components (S45). The camera storage unit 37 stores the captured image generated by the image capturing unit 32 as a captured image A (S46).

Then, the electric tool communication unit 22 transmits the operating state signal A1 representing the completion of the tightening work to the external communication unit 61 (S47). After the external communication unit 61 receives the operating state signal A1 (S48), the camera control unit 4 produces, on the basis of the operating state signal A1, the camera control signal A2 that controls the camera communication unit 33 to transmit the captured image A to the history storage device 5 (S49). Then, the external communication unit 61 transmits the camera control signal A2 to the camera communication unit 33 (S4A).

After the camera communication unit 33 receives the camera control signal A2 (S4B), the camera communication unit 33 transmits, on the basis of the camera control signal A2, the captured image A stored in the camera storage unit 37 to the history storage device 5 (S4C). This allows the captured image generated by the image capturing unit 32 of the camera device 3 to be more rapidly and precisely stored as the history information of the tightening work performed by the drive unit 21 in the history storage device 5.

Figure 11:
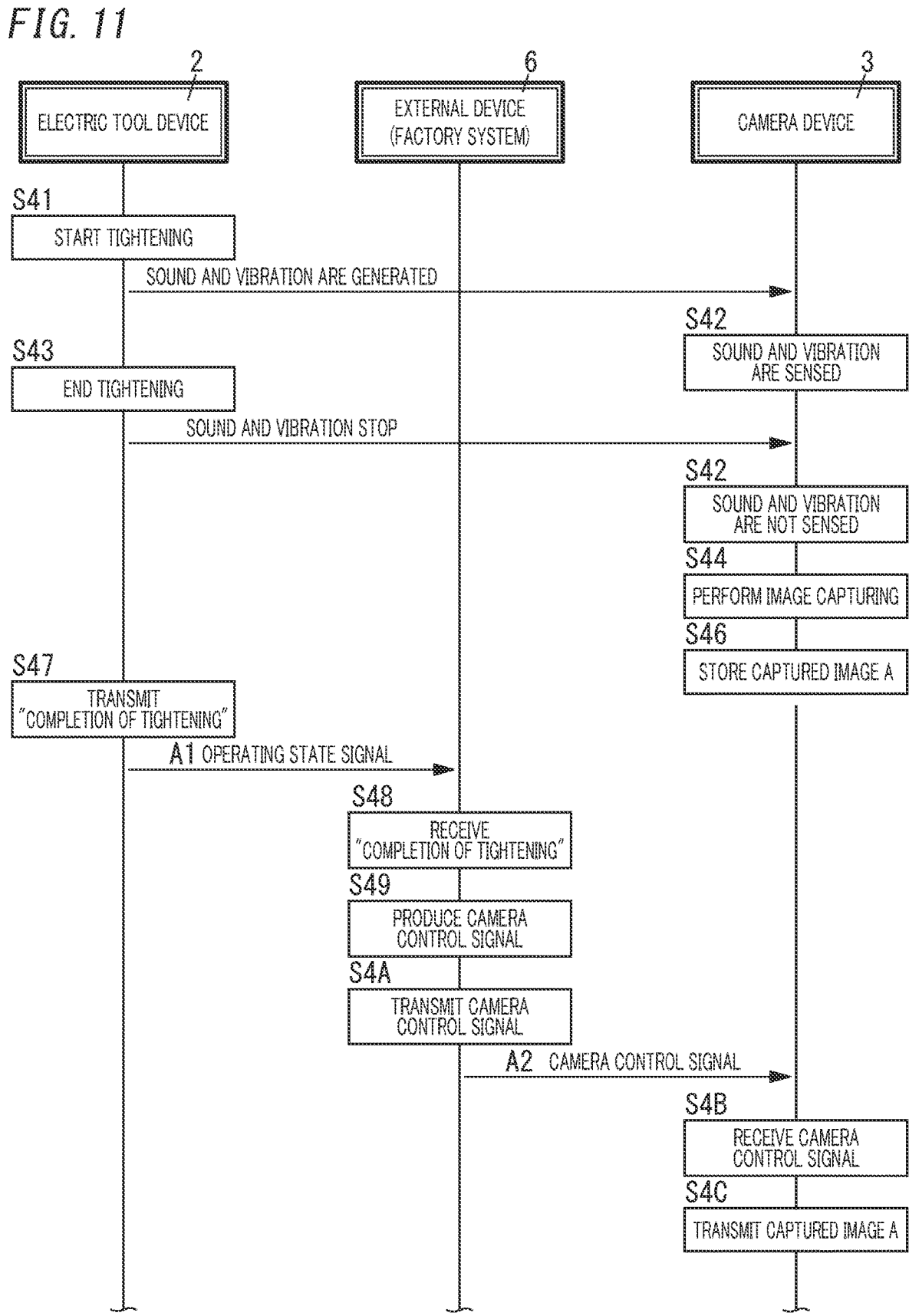
FIG. 11 is a sequence diagram illustrating an operation of the electric tool system according to the fourth embodiment.

The sequence diagram of FIG. 11 is a mere example of the operation of the electric tool system 1 in the present embodiment, an order of processing thereof may be changed as appropriate, or any processing may be omitted as appropriate.

(4-3-2) When Sound Sensor or Vibration Sensor Performs Erroneous Sensing

Using a sequence diagram of FIG. 12, a description will be given of the operation of the electric tool system 1 in the present embodiment when the sound sensor 34 or the vibration sensor 35 performs erroneous sensing. First, a case where the sound sensor 34 performs erroneous sensing is assumed.

First, the sound sensor 34 senses a sound other than that of the tightening work (e.g., a sound produced in such a case where the electric tool device 2 is moved or where work other than the tightening work is performed), and transmits the sound detection signal A3 to the camera control unit 4. However, the vibration sensor 35 senses no vibration, and therefore does not transmit the vibration detection signal A4 (S51). Then, the sound sensor 34 no longer senses the sound other than that of the tightening work, and stops the sound detection signal A3 to the camera control unit 4. The vibration sensor 35 continues to sense no vibration (S52).

Then, the image capturing control unit 36 receives only the sound detection signal A3, and does not receive the vibration detection signal A4. Therefore, the image capturing control unit 36 does not control the image capturing unit 32, and the image capturing unit 32 does not perform image capturing (S53).

Likewise, when the vibration sensor 35 performs erroneous sensing also, the image capturing control unit 36 receives only the vibration detection signal A4, and does not receive the sound detection signal A3. Therefore, the image capturing control unit 36 does not control the image capturing unit 32, and the image capturing unit 32 does not perform image capturing.

The sequence diagram of FIG. 12 is a mere example of the operation of the electric tool system 1 in the present embodiment, an order of processing thereof may be changed as appropriate, or any processing may be omitted as appropriate.

(4-3-3) When Both of Sound Sensor and Vibration Sensor Perform Erroneous Sensing Using a sequence diagram of FIG. 13, a description will be given of the operation of the electric tool system 1 in the present embodiment when both of the sound sensor 34 and the vibration sensor 35 perform erroneous sensing.

First, the sound sensor 34 senses a sound other than that of the tightening work (e.g., a sound produced in such a case where the electric tool device 2 is moved or where work other than the tightening work is performed), and transmits the sound detection signal A3 to the camera control unit 4. Likewise, the vibration sensor 35 senses vibration other than that of the tightening work (such as, e.g., vibration produced in such a case where the electric tool device 2 is moved or where work other than the tightening work is performed), and transmits the vibration detection signal A4 to the camera control unit 4 (S61).

Then, the sound sensor 34 no longer senses the sound other than that of the tightening work, and stops the sound detection signal A3 to the camera control unit 4. Likewise, the vibration sensor 35 no longer senses the vibration other than that of the tightening work, and stops the vibration detection signal A4 to the camera control unit 4 (S62).

Then, at the time of transition from the state where both of the sound detection signal A3 and the vibration detection signal A4 are output to the stopped state, the image capturing control unit 36 controls the image capturing unit 32. Then, the image capturing unit 32 captures, on the basis of the control of the image capturing control unit 36, an image of the work target to which the tightening components have been tightened (S63). Then, the camera storage unit 37 stores, as a captured image B, the captured image generated by the image capturing unit 32 (S64).

However, since the tightening work has not been performed, the camera communication unit 33 does not receive the camera control signal A2 (S65), and does not transmit the captured image B stored in the camera storage unit 37 to the history storage device 5 (S66).

Then, when a preset given time has elapsed from the time when the camera storage unit 37 stored the captured image B, the camera storage unit 37 discards the captured image B (S67). For example, the preset given time may be 30 seconds, or less than or more than 30 seconds.

This allows the captured image resulting from malfunction to be removed from the captured images to be transmitted to the history storage device 5.

The sequence diagram of FIG. 13 is a mere example of the operation of the electric tool system 1 in the present embodiment, an order of processing thereof may be changed as appropriate, or any processing may be omitted as appropriate.

(4-4) Modifications

In the embodiments described above, it may also be possible that the external communication device 6 does not have the camera control unit 4, and the camera device 3 has the camera control unit 4. In this case, the camera control unit 4 may also serve as the image capturing control unit 36.

In the embodiments described above, it may also be possible that the external communication device 6 does not have the camera control unit 4, and the electric tool device 2 has the camera control unit 4.

(Summation)

As described above, an electric tool system (1) according to a first aspect includes an electric tool device (2) and a camera device (3). The electric tool device (2) has a drive unit (21) and an electric tool communication unit (22). The drive unit (21) performs tightening work of tightening a tightening component to a work target with power from a power source. The electric tool communication unit (22) performs communication with the outside. The camera device (3) has a fixing unit (31), an image capturing unit (32), and a camera communication unit (33). The fixing unit (31) is removably attached to the electric tool device (2). The image capturing unit (32) captures an image of at least the work target. The camera communication unit (33) performs communication with the outside.

According to this aspect, there is an advantage that each of the electric tool device (2) and the camera device (3) can individually be replaced.

In the electric tool system (1) according to a second aspect, in the first aspect, the image capturing unit (32) captures an image of each of the work target and the tightening component.

According to this aspect, there is an advantage that it is possible to check whether or not the tightening component has been normally attached to the work target from the captured image generated by the image capturing unit (32).

In the electric tool system (1) according to a third aspect, in the first or second aspect, a camera control unit (4) that controls at least one of the image capturing unit (32) and the camera communication unit (33) on the basis of an operating state of the drive unit (21) is further included.

According to this aspect, there is an advantage that, on the basis of the operating state of the drive unit (21), at least one of the image capturing unit (32) and the camera control unit (33) can be controlled.

In the electric tool system (1) according to a fourth aspect, in the third aspect, the camera device (3) has at least one of a sound sensor (34) and a vibration sensor (35) that sense the operating state of the drive unit (21).

According to this aspect, there is an advantage that, since it is possible to sense the operating state of the drive unit (21) without performing communication, when the electric tool device (2) is replaced, the electric tool device (2) can easily be adapted irrespective of whether or not the electric tool device (2) has a communication means.

In the electric tool system (1) according to a fifth aspect, in the third aspect, the camera device (3) has the camera control unit (4). The electric tool communication unit (22) transmits, to the camera control unit (33), an operating state signal (A1) representing the operating state of the drive unit (21). The camera control unit (4) controls at least one of the image capturing unit (32) and the camera communication unit (33) on the basis of the operating state signal (A1) received by the camera communication unit (33).

According to this aspect, there is an advantage that the electric tool system (1) need not newly include an external communication device (6), and the configuration of the electric tool system (1) can be simplified.

In the electric tool system (1) according to a sixth aspect, in the third aspect, the electric tool device (2) has the camera control unit (4). The camera control unit (4) produces a camera control signal (A2) that controls at least one of the image capturing unit (32) and the camera communication unit (33) on the basis of an operating state signal (A1) representing the operating state of the drive unit (21). The electric tool communication unit (22) transmits the camera control signal (A2) to the camera communication unit (33).

According to this aspect, there is an advantage that the electric tool system (1) need not newly include an external communication device (6), and the configuration of the electric tool system (1) can be simplified.

In the electric tool system (1) according to a seventh aspect, in the third aspect, an external communication device (6) having the camera control unit (4) and an external communication unit (61) is further included. The electric tool communication unit (22) transmits, to the external communication unit (61), an operating state signal (A1) representing the operating state of the drive unit (21). The camera control unit (4) produces a camera control signal (A2) that controls at least one of the image capturing unit (32) and the camera communication unit (33) on the basis of the operating state signal (A1) received by the external communication unit (61). The external communication unit (61) transmits the camera control signal (A2) to the camera communication unit (33).

According to this aspect, there is an advantage that, when either one of the electric tool device (2) and the camera device (3) is replaced, by merely changing the setting of the external communication unit (61) included in the external communication device (6), the electric tool device (2) or the camera device (3) can easily be adapted.

In the electric tool system (1) according to an eighth aspect, in any of the fifth to seventh aspects, a history storage device (5) that stores history information of the tightening work is further included. The camera device (3) further has at least one of a sound sensor (34) and a vibration sensor (35), and a camera storage unit (37). The sound sensor (34) or the vibration sensor (35) senses the operating state of the drive unit (21). The camera storage unit (37) stores the captured image generated by the image capturing unit (32) on the basis of a sensing result from at least one of the sound sensor (34) and the vibration sensor (35). The camera control unit (4) controls the camera communication unit (33) on the basis of the operating state signal (A1) to cause the captured image to be transmitted from the camera communication unit (33) to the history storage device (5).

According to this aspect, there is an advantage that the captured image generated by the image capturing unit (32) due to malfunction of the sound sensor (34) or the vibration sensor (35) can be deleted and transmitted to the history storage device (5).

An electric tool device (2) according to a ninth aspect includes a drive unit (21), an electric tool communication unit (22) that communicates with the outside, and an attachment unit (25) that allows a camera device (3) that captures an image of at least a work target to be removably attached. The drive unit (21) tightens a tightening component to the work target with power from a power source. The electric tool communication unit (22) communicates with the outside. The attachment unit (25) allows the camera device (3) that captures an image of at least the work target to be removably attached.

According to this aspect, there is an advantage that the electric tool device (2) to which the camera device (3) can removably be attached can be provided.

A camera device (3) according to a tenth aspect captures an image of a work target to which a drive unit (21) of an electric tool device (2) tightens a tightening component with power from a power source, and has a fixing unit (31) and a camera communication unit (33). The fixing unit (31) is removably attached to the electric tool device (2). The camera communication unit (33) communicates with the outside.

According to this aspect, there is an advantage that the camera device (3) capable of being removably attached to the electric tool device (2) can be provided.

The camera device (3) according to an eleventh aspect includes, in the tenth aspect, at least one of the sound sensor (34) and the vibration sensor (35). The sound sensor (34) or the vibration sensor (35) senses an operating state of the drive unit (21).

According to this aspect, there is an advantage that, since it is possible to sense the operating state of the drive unit (21) without performing communication, when the electric tool device (2) is replaced, the easily adaptable camera device (3) can be provided irrespective of whether or not the electric tool device (2) has a communication means.

REFERENCE SIGNS LIST

1 Electric tool system
2 Electric tool device
21 Drive unit
22 Electric tool communication unit
25 Attachment unit
3 Camera device
31 Fixing unit
32 Image capturing unit
33 Camera communication unit
34 Sound sensor
35 Vibration sensor
37 Camera storage unit
4 Camera control unit
5 History storage device
6 External communication device
61 External communication unit
A1 Operating state signal
A2 Camera control signal

The invention claimed is:

1. An electric tool system comprising:

an electric tool device having a drive unit that performs tightening work of tightening a tightening component to a work target using power from a power source and an electric tool communication unit that performs communication with outside;

a camera device having a fixing unit that is removably attached to the electric tool device, an image capturing unit that captures an image of at least the work target, and a camera communication unit that performs communication with the outside; and a processor that controls at least one of the image capturing unit and the camera communication unit on the basis of an operating state of the drive unit, wherein the camera device includes at least one of a sound sensor and a vibration sensor that senses a first operating state, as a sensing result, indicating whether the drive unit is (1) in operation, in which the drive unit performs the tightening work, or (2) not in operation, in which the drive unit does not perform the tightening work, and the processor controls the at least one of the image capturing unit and the camera communication unit on a basis of the first operating state.

2. The electric tool system according to claim 1, wherein the image capturing unit captures an image of each of the work target and the tightening component.

3. The electric tool system according to claim 1, wherein the camera device includes the processor, the electric tool communication unit transmits, to the camera communication unit, an operating state signal output from the drive unit and representing a second operating state indicating whether the drive unit is (1) in operation, in which the drive unit performs the tightening work, or (2) not in operation, in which the drive unit does not perform the tightening work, and the processor controls the at least one of the image capturing unit and the camera communication unit on a basis of the operating state signal received by the camera communication unit.

4. The electric tool system according to claim 1, wherein the electric tool device includes the processor, the processor produces a camera control signal that controls the at least one of the image capturing unit and the camera communication unit on a basis of an operating state signal output from the drive unit and representing a second operating state indicating whether the drive unit is (1) in operation, in which the drive unit performs the tightening work, or (2) not in operation, in which the drive unit does not perform the tightening work, and the electric tool communication unit transmits the camera control signal to the camera communication unit.

5. The electric tool system according to claim 1, further comprising:

an external communication device having an external communication unit and the processor, wherein the electric tool communication unit transmits, to the external communication unit, an operating state signal output from the drive unit and representing a second operating state indicating whether the drive unit is (1) in operation, in which the drive unit performs the tightening work, or (2) not in operation, in which the drive unit does not perform the tightening work, the processor produces a camera control signal that controls the at least one of the image capturing unit and the camera communication unit on a basis of the operating state signal received by the external communication unit, and the external communication unit transmits the camera control signal to the camera communication unit.

6. The electric tool system according to claim 3, further comprising:

a history storage device that stores history information of the tightening work, wherein the camera device further includes a camera storage unit that stores the captured image generated by the image capturing unit on a basis of the sensing result, and the processor controls the camera communication unit on the basis of the operating state signal to cause the captured image to be transmitted from the camera communication unit to the history storage device.

7. A camera device comprising:

an image capturing unit that captures an image of a work target of tightening work to which a drive unit of an electric tool device tightens a tightening component using power from a power source;

a fixing unit that is removably attached to the electric tool device;

a camera communication unit that communicates with the outside;

at least one of a sound sensor and a vibration sensor that senses a first operating state, as a sensing result, indicating whether the drive unit is (1) in operation, in which the drive unit performs the tightening work, or (2) not in operation, in which the drive unit does not perform the tightening work, a processor that controls the at least one of the image capturing unit and the camera communication unit on a basis of the first operating state.

* * * * *